United States Patent [19]

Freedman

[11] 4,084,977

[45] Apr. 18, 1978

[54] GLASS AND REFRACTORY FIBRE MATERIALS AND METHOD FOR MAKING SAME

[75] Inventor: Clive M. Freedman, Littleborough, England

[73] Assignee: TBA Industrial Products Limited, Manchester, England

[21] Appl. No.: 511,480

[22] Filed: Oct. 1, 1974

Related U.S. Application Data

[63] Continuation-in-part of Ser. No. 423,772, Dec. 11, 1973, abandoned.

[30] Foreign Application Priority Data

Dec. 12, 1972 United Kingdom .............. 57297/72

[51] Int. Cl.$^2$ ............................................. C03C 25/00
[52] U.S. Cl. .......................................... 106/50; 65/2; 65/31; 106/52
[58] Field of Search .................. 65/1, 2, 31; 106/39.8, 106/50, 52

[56] References Cited

U.S. PATENT DOCUMENTS

| 2,494,259 | 1/1950 | Nordberg | 106/50 |
| 3,282,770 | 11/1966 | Stookey et al. | 65/31 |
| 3,445,254 | 5/1969 | Tiede | 65/31 X |

FOREIGN PATENT DOCUMENTS

| 1,014,344 | 8/1952 | France. | |
| 155,912 | 11/1963 | U.S.S.R. | 65/31 |

*Primary Examiner*—Robert L. Lindsay, Jr.
*Attorney, Agent, or Firm*—Cushman, Darby & Cushman

[57] ABSTRACT

A glass fibre product consists of less than 80% by weight SiO$_2$ from 20 to 25% by weight of TiO$_2$ and not more than about 0.1% by weight of alkali metal oxide, and is made by leaching with acid a glass fibre composition consisting of from 20 to 40% by weight of alkali metal oxide, from more than 12 up to 20% TiO$_2$ and the balance to 100% of SiO$_2$ and having a silica:titania ratio within a selected range.

8 Claims, No Drawings

GLASS AND REFRACTORY FIBRE MATERIALS AND METHOD FOR MAKING SAME

CROSS REFERENCE TO RELATED APPLICATION

This application is a continuation-in-part of application Ser. No. 423,772 filed Dec. 11, 1973, and now abandoned.

This invention concerns improvements in or relating to glass and refractory fibre materials made therefrom.

Stable glasses in the $Na_2O$—$TiO_2$—$SiO_2$ system are known and are used where glasses of low thermal expansion are required, eg. in astronomical telescope mirrors.

It has been proposed in U.S. Pat. No. 2,494,259 (1946) to produce acid-leached glasses in the form of fibres from compositions containing not more than 75% $SiO_2$, at least one flux consisting of alkali metal oxide ($R_2O$) or boric oxide and an oxide of one or more of the metals beryllium, magnesium, calcium, zinc, strontium, cadmium, barium, aluminium, titanium, zirconium and thorium.

It is stated that during leaching of these glasses the greater part, if not all, of the flux or fluxes is extracted and the final compositions of the fibres comprising over 80% of $SiO_2$ and a substantial amount (less than 20%) of the said metal oxide(s). In all the preferred embodiments of the concept disclosed in this prior specification, the $SiO_2$ content of the end product is never less than about 87%.

In the periodical "Glass and Ceramics", Volume 16, Part 11 (1959), pages 608 to 612, A. F. Zak describes the effect of leaching sodium silicate-based glasses containing minor proportions of others constituents such as $B_2O_3$, CaO, BaO, ZnO, $Al_2O_3$ and $TiO_2$, and from this teaching it can be concluded that the silica content of the leached fibre cannot be reduced to less than about 84%, otherwise changes in structure in the original glass composition result in dissolution of the glass in the acid. Furthermore, it is stated that if the content of these metal oxides is increased over about 12% the said metal oxide is leached out with the alkali metal oxide so that only silica remains in the glass, with resultant loss of desirable characteristics.

I have found that, surprisingly, leached glass fibres consisting of silica, titania and not more than a trace of alkali metal oxide can, in fact, be produced, and that, surprisingly, these products have unexpectedly superior strength properties and minimal shrinkage. These features of the present invention are all the more surprising in view of the fact that the disclosures referred to above lead directly away from the possibility of being able to leach fibrous compositions containing more than about 12% of said metal oxides, including titania.

According to the present invention, I provide a glass fibre product consisting of less than 80% by weight of silica, from 20 to 25%, preferably 20 to about 23%, of titania, and not more than about 0.1% of alkali metal oxide.

The present invention also provides a method of manufacturing the glass fibre product aforesaid, comprising leaching with an acid a glass composition in the form of fibres, which composition consists of from 20 to 40% by weight of an alkali metal oxide, from more than 12% up to 20% of titanium dioxide and the balance to 100% of silicon dioxide and wherein the silica:titania ratio is within the range from not more than about 3.4:1 for an alkali metal content of up to 25% to not more than 4.0:1 for an alkali metal content of from 25 to 40%.

The term "fibres" as used herein and in the claims includes staple fibre formed by such means as hot blast jets and centrifugal spinning discs, glass filaments as made by normal drawing techniques, the staple fibre or multifilament strands deposited as a felt or twisted, woven, knitted or otherwise formed into conventional textile articles.

The fibres preferably are leached by a mineral acid, preferably at a pH within the range 2.4 to 0.3 more preferably from 1.7 to 1.3, followed by washing and drying the leached material.

The product, consisting of silica, titania and only traces of alkaline earth oxides, is found to have unexpectedly superior strength properties and minimal shrinkage when compared with wholly siliceous products, or when compared with products containing more than two main components, and is referred to hereafter as "fibrous refractory material".

The alkali metal oxide content of the glass used in the aforesaid process and the silica:titania ratio together determine the effective temperature for filament drawing, the time needed to leach away the alkali metal oxide, and the final strength of the filament. We have found that for sodium oxide contents below 25% and a silica:titania ratio of less than or equal to 3.4:1 the drawing temperature exceeds 1100° C and it is advisable to use noble metal bushings, and a long leaching time is needed to reduce the alkali metal oxide content to substantially zero, whereas for sodium oxide contents of more than 40% and with similar silica:titania ratios the glass exhibits a sharper melting point below 1000° C and narrow ranges of glass viscosity and surface tension within which filament drawing is impractical.

With a sodium oxide content approaching 40% and a silica-titania ratio of not greater than 4.0:1, short leaching times, high drawing temperatures and low strengths after leaching are obtained.

Accordingly, the silica:titania ratio is preferably within the range from 3.4:1 to 4.0:1, within an alkali metal oxide content range of from 20 to 40%. Preferably the mean diameter of the fibres is not greater than 15 μm, since otherwise the kinetics of the leaching stage are unfavourable.

In one preferred embodiment of the invention, the sodium titanium silicate filaments, staple fibres or articles made therefrom of twisted, woven, knitted or felt-like form as described above are subjected to leaching in a mineral acid, for example in 4N sulphuric acid maintained at 90° C, followed by a washing process to remove the leached out sodium salts and then the articles are dried to remove water absorbed by them during chemical treatment. It is a feature of this invention that articles so formed are sufficiently strong for immediate use and can be subjected to temperature up to 1100° C with minimised dimensional changes. These features are superior to those exhibited by wholly siliceous materials such as described in U.S. Pat. No. 3,356,563 where the siliceous article is barely handleable in the leached washed state having, in the case of a woven cloth a strength only 1.5% of that of the present invention. Wholly siliceous fabrics shrink by about 35% during the firing process necessary to impart strength and, like other known wholly siliceous materials, are not resistant to alkali attack. A further commercial advantage of this invention, over wholly siliceous products prepared for example from E-glass, is the reduced material loss on leaching.

Although the strength of fibrous articles made according to the foregoing invention is more than adequate for handling purposes, further increases in tensile strength and modulus can be obtained by two routes.

That is, in another preferred aspect of the present invention, a method of improving tensile strength and modulus properties of the fibrous refractory material aforesaid, comprises subjecting the said refractory material to elevated temperature, preferably within the range from 900° to 1100° C for example to 900° C for a period of 3 hours, to effect shrink stabilisation.

This treatment can improve the tensile strength and modulus by about 30 to 50% over that of the leached and washed material.

In yet another preferred aspect of the present invention, a further method of improving tensile strength and modulus properties of the fibrous refractory material aforesaid, comprises subjecting the said refractory material to treatment with alkali, for example a boiling saturated solution of calcium hydroxide for not more than 3 hours.

After this treatment it is observed that tensile strength and/or modulus rise to levels similar to those achieved by thermal treatment. This phenomenon is quite unlike the effect of alkalies on glasses such as sodium borosilicate, or soda lime glass where the strength of fibres is significantly reduced on long-term exposure to alkalies. Leached sodium titanium silicate fibres could therefore be advantageously employed to reinforce cementitious media.

Whilst the foregoing matter has specifically described sodium titanium silicate multifilament and staple fibre manufacture and its treatment to obtain titanium silicate articles, the invention may also comprise the use of an alkali metal oxide such as potassium or lithium oxide, employed either alone or in combination with sodium oxide, or with each other.

The following examples are given to illustrate preferred embodiments of this invention in more detail, Example 5 being included for comparative purposes, to show the use of a composition containing only 12% of titania and having a silica:titania ratio greater than 4:1.

EXAMPLE 1

A glass was made consisting of:

58% silica  
17% titania  
25% sodum oxide  
$SiO_2:TiO_2 = 3.41:1$

This glass was melt drawn at 1150° C and the resulting filaments were leached for 3 hours at 90° C in 4N sulphuric acid, to reduce the sodium oxide content to less than 0.1%, then washed in demineralised water and dried at 100° C to remove water. ($TiO_2$ content = 20%)

Properties of the drawn filaments were:

| | |
|---|---|
| tensile strength | 0.83 $GNm^{-2}$ |
| tensle modulus | 43 $GNm^{-2}$ |

At the leached stage:

| | |
|---|---|
| tensile strength | 0.69 $GNm^{-2}$ |
| tensile modulus | 40 $GNm^{-2}$ |

After firing for 4 hours at 900° C:

| | |
|---|---|
| tensile strength | 0.83 $GNm^{-2}$ |
| tensile modulus | 94 $GNm^{-2}$ |

EXAMPLE 2

A glass was made consisting of:

54% silica  
17% titania  
29% sodium oxide  
$SiO_2:TiO_2 = 3.176:1$

This glass was melt drawn at 950° C; the resulting filaments were leached for 40 minutes at 90° C in 4N sulphuric acid, washed in demineralised water to remove all the sodium salts, and dried at 100° C to remove water. ($TiO_2$ content = 20.8%)

Properties of the drawn filaments were:

| | |
|---|---|
| tensile strength | 0.83 $GNm^{-2}$ |
| tensile modulus | 43 $GNm^{-2}$ |

After leaching the properties were:

| | |
|---|---|
| tensile strength | 0.52 $GNm^{-2}$ |
| tensile modulus | 43 $GNm^{-2}$ |

After firing for 3 hours at 900° C the properties were:

| | |
|---|---|
| tensile strength | 0.84 $GNm^{-2}$ |
| tensile modullus | 51 $GNm^{-2}$ |

After leaching and treatment in boiling saturated $Ca(OH)_2$ solution for 3 hours the properties were:

| | |
|---|---|
| tensile strength | 0.77 $GNm^{-2}$ |
| tensile modulus | 67 $GNm^{-2}$ |

EXAMPLE 3

A glass was made consisting of:

51% silica  
15% titania  
34% sodium oxide  
$SiO_2:TiO_2 = 3.4:1$

This glass was melt drawn at 1020° C; the resulting 10.5μm filaments were leached for 60 minutes at 90° C in 4N sulphuric acid, washed in demineralised water to remove all the sodium salts, and dried at 100° C to remove water. ($TiO_2$ content = 20.4%)

Properties of the drawn filaments were:

| | |
|---|---|
| tensile strength | 0.50 $GNm^{-2}$ |
| tensile modulus | 40 $GNm^{-2}$ |

After leaching the properties were:

| strength | 0.38 GNm$^{-2}$ |
|---|---|
| tensle modulus | 33 GNm$^{-2}$ |

After firing for 3 hours at 900° C the properties were:

| tensile strength | 0.83 GNm$^{-2}$ |
|---|---|
| tensile modulus | 67 GNm$^{-2}$ |

After leaching and treatment in boiling saturated Ca(OH)$_2$ solution for 3 hours the properties were:

| tensile strength | 0.80 GNm$^{-2}$ |
|---|---|
| tensile modulus | 66 GNm$^{-2}$ |

EXAMPLE 4

A glass was made consisting of:

| 54% silica | ) | |
|---|---|---|
| 16% titania | ) | SiO$_2$:TiO$_2$ = 3.375:1 |
| 16.5% sodium oxide | | |
| 13.5% potassium oxide | | |

This glass was melt drawn at 900° C and the resulting 10μm filaments were found to be completely free of sodium and potassium oxides after leaching for 40 minutes in 4N sulphuric acid at 90° C.

The properties of the materials used in and made by this Example were similar to those of the materials of Example 2.

EXAMPLE 5

A glass was made consisting of:

| 54% silica | ) | |
|---|---|---|
| 12% titania | ) | SiO$_2$:TiO$_2$ = 4.5:1 |
| 34% sodium oxide | | |

This glass was melt drawn at 1100° C; the resulting 10μm filaments were leached for 10 minutes at 90° C in 4N sulphuric acid, washed in demineralised water to remove all the sodium salts, and dried at 100° C to remove water. (TiO$_2$ content = 16.1%)

Properties of the drawn filaments were:

| tensile strength | 0.35 GNm$^{-2}$ |
|---|---|
| tensile modulus | 36 GNm$^{-2}$ |

After leaching the properties were:

| tensile strength | 0.23 GNm$^{-2}$ |
|---|---|
| tensle modulus | 36 GNm$^{-2}$ |

After firing at 900° C for 3 hours the properties were:

| tensile strength | 0.45 GNm$^{-2}$ |
|---|---|
| tensile modulus | 71 GNm$^{-2}$ |

It can be seen that the tensile properties of the leached, and of the leached and fired, materials of this Example are significantly lower than those properties of the materials of the preceding Examples.

EXAMPLE 6

Fabrics were made from E-glass and from the glass of Example 2, with the following cloth construction and properties:

| | E-glass | Glass of Example 2 |
|---|---|---|
| Weave | Plain | Plain |
| Wt.unit area kg/m$^2$ | 0.845 | 0.775 |
| Strength after leaching (wet) (Newtons per meter) | 180 | 5000 |
| After leaching and Firing:- | | |
| Weight loss % | 51% | 32% |
| Shrinkage % area | 36% | 19% |

Titanium silicate articles formed according to this invention retain their superior tensile properties up to 1100° C, and their fibrous form up to c.1400° C (in most cases for somewhat longer periods of time than for equivalent articles made from standard siliceous materials), after which they sinter together but do not melt until exposed to 1600° to 1700° C. That is, the devitrification rate of articles of this invention is slower. Since the products of this invention are resistant to high temperature they may also be found suitable for high temperature reinforcement of metals such as aluminium and in ceramics, and as simple thermal insulating media.

Modifications can, of course, be made in the various treatment stages referred to above; for example, acids other than sulphuric acid may be used for leaching, and alkalis other than calcium hydroxide may be used for the alkali treatment.

I claim:

1. A glass fibre product consisting of less than 80% by weight SiO$_2$, from 20 to 25% by weight TiO$_2$ and not more than about 0.1% by weight of alkali metal oxide.

2. A glass fibre product according to claim 1, comprising from 20 to about 23% of TiO$_2$.

3. A method of manufacturing a glass fibre product consisting of less than 80% by weight of SiO$_2$, from 20 to 25% by weight TiO$_2$ and not more than about 0.1% by weight of alkali metal oxide, said method comprising leaching with an acid a glass composition in the form of fibres, which composition prior to said leaching consists of from 20 to 40% by weight of an alkali metal oxide, from more than 12% up to 20% of TiO$_2$ and the balance to 100% of SiO$_2$, and wherein the silica:titania ratio is within the range from not greater than 3.4:1 for an alkali metal content of up to 25% to not greater than 4.0:1 for a alkali metal content of from 25% to 40%, the resulting product exhibiting improved strength properties and minimal shrinkage as compared to wholly siliceous products.

4. A method according to claim 3, wherein the fibres are leached at a pH within the range from 2.4 to 0.3.

5. A method according to claim 3, wherein the leached fibres are shrink stabilised by subjecting them to elevated temperature.

6. A method according to claim 3, wherein a property of the leached fibre selected from tensile strength and tensile modulus, is further improved by subjecting the leached fibre to treatment with an alkali.

7. A method according to claim 3, wherein said acid leaching step is contained until the alkali metal content of the glass product is substantially zero.

8. A method according to claim 5, wherein the shrink stabilization is conducted at a temperature in the range of from 900° to 1100° C.

* * * * *